United States Patent [19]

Faust et al.

[11] 4,175,154

[45] Nov. 20, 1979

[54] SHEET BACKING FOR DECORATIVE COVERING MATERIAL

[75] Inventors: Kenneth J. Faust, Cressona; Douglas C. Woerner, Northampton, both of Pa.

[73] Assignee: GAF Corporation, New York, N.Y.

[21] Appl. No.: 863,431

[22] Filed: Dec. 22, 1977

[51] Int. Cl.² ............... B32B 3/26; B32B 5/20; B05D 5/00; B05D 3/02
[52] U.S. Cl. ................... 428/313; 427/244; 427/373; 428/317; 428/337
[58] Field of Search ........... 428/268, 290, 304, 308, 428/310, 313, 314, 315, 317, 318, 337; 427/244, 373

[56] References Cited

U.S. PATENT DOCUMENTS

| | | | |
|---|---|---|---|
| 2,879,197 | 3/1959 | Muskat et al. | 428/159 |
| 3,050,427 | 8/1962 | Slayter et al. | 428/245 |
| 3,483,069 | 12/1969 | Cairns et al. | 428/113 |
| 3,647,608 | 3/1972 | Enlow et al. | 428/313 |
| 3,867,494 | 2/1975 | Rood et al. | 428/315 |
| 3,962,522 | 6/1976 | Chang | 428/425 |
| 4,028,158 | 6/1977 | Hipchen et al. | 428/313 |

*Primary Examiner*—William J. Van Balen
*Attorney, Agent, or Firm*—Walter C. Kehm; Joshua J. Ward

[57] ABSTRACT

Decorative sheet-type covering material and method for making same. The material has a substrate comprising a porous mat saturated and completely coated on both sides with foamed, cured PVC plastisol or organosol. The substrate is made by coating one side of a porous mat with foamable PVC plastisol or organosol and then heating and foaming the plastisol or organosol.

5 Claims, No Drawings

SHEET BACKING FOR DECORATIVE COVERING MATERIAL

BACKGROUND OF THE INVENTION

Decorative, flexible, sheet-type covering materials such as wall or floor coverings are conventionally manufactured with nonwoven organic or glass fiber mats or woven cloth as a substrate. Where glass fiber mats are used, it is desirable to insure that both faces of the glass mat are covered with a protective coating to protect those handling the covering material from the skin irritation associated with handling glass fiber material. Availability of a suitable surface for printing is also desirable. Satisfactory substrates using glass mats are especially desirable as a replacement for the more commonly used asbestos felt substrates in view of the currently recognized hazards to health involved in the use of asbestos.

While glass mats coated with protective material are known, the use of such mats coated on both sides or faces with protective material has in the past involved lamination of coatings, the use of release paper or saturation as in a dip and squeeze process. In other applications, glass mats have been coated on one side with cured polyvinyl chloride (PVC) plastisol or organosol as illustrated for instance in U.S. Pat. No. 3,490,985 to Marzocchi et al.

SUMMARY OF THE INVENTION

It is an object of the invention to provide improved, decorative, flexible sheet-type covering material which has a substrate comprining a porous mat saturated and completely coated on both faces with foamed, cured PVC plastisol or organosol. A further object of the invention is to provide a method for making covering material of the invention comprising coating one side only of the porous mat with foamable PVC plastisol or organosol, causing said plastisol or organosol to completely penetrate said mat, foaming said plastisol or organosol so as to saturate said mat and completely coat said mat on both sides with the thus foamed plastisol or organosol and then curing the thus foamed plastisol or organosol to provide sheet-type covering material of the invention.

DETAILED DESCRIPTION OF THE INVENTION

As mentioned above, the decorative, flexible, sheet-type covering material of the invention has a substrate comprising a porous mat saturated and completely coated on both faces with foamed, cured PVC plastisol or organosol. While the invention is applicable to porous mats made from any flexible material, the preferred material is glass fibers in woven or nonwoven form with nonwoven glass fiber mats being especially preferred. Mats for use in the invention should have openings of a suitable size so that the PVC plastisol or organosol used can penetrate the mat as described below to insure saturation of the mat and thorough coating of the mat on both sides with the foamed PVC plastisol or organosol. Complete coverage of both sides of the mat is essential to protect those handling the finished covering material from exposure to the glass fibers making up the mat. When using the preferred plastisols or organosols described below, nonwoven glass fiber mats suitable for use in the invention generally have openings averaging between about 1 and about 20 mils in the smallest linear dimension with at least about 50% of such openings having smallest linear dimensions between about 2 and about 10 mils. Preferred mats include those having a thickness between about 10 and about 40 mils and a density between about 1 and about 4 lbs. per 100 square foot. Such mats may be manufactured by conventional techniques used for manufacturing nonwoven glass mats with the glass fibers used preferably having an average diameter between about 5 and about 20 microns, more preferably between about 7 and 15 microns, and fiber lengths between about 0.2 and about 1.5 inch. Binders conventionally used for coating glass fibers may be used and where used are normally present in amounts between about 1 and about 50 wt. % of the mat. Suitable binders for coating glass fibers of the mats used in the invention include, for instance, urea-formaldehyde, latexes, thermosetting resins such as polyester resins, epoxy resins and the like and may include, among other conventional binders, those mentioned in U.S. Pat. No. 3,554,851 to Modigliani, the disclosure of which is incorporated herein by reference. The binder may, of course, be applied to the glass fibers in a conventional manner.

Decorative, flexible, sheet-type covering material contemplated by the invention includes conventional wall and floor coverings and especially materials such as sheet vinyl, linoleum and the like. Such sheet vinyl flooring frequently has one or more foamed or unfoamed vinyl layers of the PVC type generally used in vinyl flooring over the substrate. The vinyl layer may comprise any of the PVC resin materials normally used in connection with the manufacture of sheet vinyl flooring and may specifically include but is not limited to those described in U.S. Pat. No. 3,458,337, the disclosure of which is incorporated herein by reference. The vinyl layer in such flooring materials is typically on the order of between about 5 and about 25 mils thick and may be opaque, translucent or transparent as desired. Other layers of sealer, pigmented layers, plastisols, wear layers, etc. known in the art may, of course, be used. Where transparent or translucent vinyl layers are used, it is frequently desirable to apply a printed design to the coated substrate formed in accordance with the invention. Since the foamed coating on the substrate may not always be sufficiently smooth for direct printing on some designs, a conventional sealing or priming coat of latex or of plastisol or organosol as described for instance in U.S. Pat. No. 3,519,460 may be used. Conventional latex containing an acrylic polymer such as the prime coat described in the above-mentioned U.S. Pat. No. 3,458,337 is, for instance, suitable for this purpose.

The PVC plastisol or organosol used in forming the foamed coating of the product of the invention may be any of the conventional PVC materials known in the art for use as foamed layers on flooring materials and includes for instance those described in the above-mentioned U.S. Pat. No. 3,458,337. A variety of PVC plastisols and organosols suitable for use in the invention are also described in U.S. Pat. No. 3,293,094, the disclosure of which is also incorporated herein by reference. The foaming or blowing agent incorporated in the foamable plastisol may also be a conventional blowing agent or catalyst-activated blowing agent such as are well known in the art for producing foamed plastisols or organosols. Suitable blowing agents include, for instance, azodicarbonamide (ABFA) and other conventional blowing agents such as those enumerated in the above-mentioned U.S. Pat. No. 3,293,094.

While a wide variety of conventional PVC plastisols or organosols are suitable for use in the product and process of the invention, selection of a particular plastisol or organosol or mixture thereof suitable for a given application preferably takes into account such factors as the nature of the porous mat to be saturated and coated, the particle size of PVC resin, the viscosity and degree of solvation of the plastisol, etc. Generally the most important factors are the nature of the mat, especially the distribution and size of the openings in the mat, the amount and size of resin particles in the plastisol or organosol, and the viscosity of the plastisol or organosol. For ease of application to the mat and to insure complete saturation and coating of both sides of the mat by the foamed plastisol or organosol, it is preferred that the plastisol or organosol be of a suitable viscosity so that it can be coated on one surface only of the porous mat and allowed to penetrate the mat either at the coating temperature or by increase in temperature after the coating step. If a plastisol or organosol of too great a viscosity is used, complete penetration, saturation and coating of both sides of the mat will not take place and the finished substrate may well be of the type desired in the above-mentioned U.S. Pat. No. 3,490,985 rather than the type which is the subject of the present invention. If plastisol or organosol of too low a viscosity is used, the plastisol or organosol will tend to pass through the porous mat too readily prior to foaming thereof and proper saturation and coating may not be obtained.

While suitable viscosities for plastisols and organosols used in the present invention may vary widely depending upon the type of mat and coating and foaming conditions used, preferred viscosities when using preferred glass fiber mats of the type described above include plastisols and organosols having viscosities between about 500 and about 10,000 centipoises (cp) at coating temperatures as measured on a Brookfield RVF viscometer with a number 3 spindle at 20 RPM. While coating is frequently carried out at room temperature, this is by no means essential and coating temperatures between about 50° and about 150° F. are suitable with many of the commonly used plastisols and organosols. In a preferred embodiment of the invention, coating is carried out at between about 50° and about 120° F. using a plastisol or organosol which penetrates the mat to a depth of between about one half and about three fourths the thickness of the mat at coating temperature. The coating is then heated to a temperature between about 200° and about 400° F. to cause the plastisol or organosol to completely penetrate the mat. Heating to cause penetration of the mat may be a separate manufacturing step or may be part of the heating process used to foam and cure the plastisol or organosol.

For use with the preferred type of glass fiber mat described above, PVC resins are usually a combination of suspension and dispersion resins, although completely satisfactory results are obtained with 100% dispersion resin. Dispersion resins in general are more expensive than suspension resins but tend to have smaller particle sizes, e.g. between about 0.5 and about 5 microns, and higher intrinsic viscosities than suspension resins. Dispersion resins are commonly made by emulsion polymerization and are well known to those skilled in the art. Suspension resins are made by suspension polymerization and have relatively lower intrinsic viscosity and relatively larger particle size than dispersion resins. Particle sizes for typical PVC suspension resins frequently range between about 5 and about 50 microns. In practicing preferred embodiments of the invention, PVC plastisols or organosols in which dispersion resin comprises between about 35 and about 100 weight percent of the total PVC resin content are preferred with dispersion resin contents between about 45 and about 75 weight percent being especially preferred when the preferred glass fiber mats described above are used and the organosol or plastisol is coated on one side of the mat but does not penetrate completely through the mat until further heating takes place.

Application of PVC plastisol or organosol to porous mats in accordance with the invention may be by any suitable means such as knife coating or roll coating. Using the preferred glass fiber mats and plastisols or organosols described above, plastisol or organosol coatings between about 10 and about 20 mils thick are generally satisfactory to provide complete saturation and coverage of both faces of the mat when the plastisol or organosol is foamed.

The following examples illustrate preferred embodiments of the invention but are not intended to limit the scope of the invention.

EXAMPLE I

To demonstrate the utility of the invention, a metered coating approximately 12 mils thick of foamable PVC plastisol was drawn onto a nonwoven fiberglass mat using a conventional knife coater. The mat was made up of glass fibers having an average diameter of about 9 microns and an average length of about 0.75 inch. The fibers were coated with a urea-formaldehyde binder with the binder making up about 15 weight percent of the mat. The mat had a total density of 1.4 lbs. per 100 square feet with openings in the mat having smallest linear dimensions averaging about 5 mils. The mat was 15 mils thick. The plastisol was coated onto the mat at a temperature of 75° F. The foamable plastisol coated onto the mat had the following composition:

| Ingredient | Parts by Weight |
| --- | --- |
| PVC Homopolymer Dispersion Resin | 50 |
| PVC Homopolymer Suspension Resin | 50 |
| Plasticizer | 60 |
| Pigment | 7.5 |
| Blowing Agent (ABFA) | 2.5 |
| Stabilizer-Catalyst | 2.5 |

After coating of the mat as described above, the coated mat was then heated to a temperature of 370° F. whereby the plastisol, which had an original viscosity at coating temperature of 800 cp and had previously penetrated about one-half the thickness of the mat, was allowed to completely penetrate the mat. Upon foaming of the plastisol, it was found that the finished substrate product was completely saturated and coated on both sides with the foamed PVC plastisol.

EXAMPLE II

Utility of the invention was further demonstrated by coating approximately a 12 mil thick layer of foamable plastisol onto one face only of a nonwoven fiberglass mat approximately 18 mils thick and weighing approximately 2.3 lbs. per 100 square feet using a conventional three roll reverse roll coater. The plastisol used was the same as that described in Example I except that PVC was used in amounts of 65 parts by weight dispersion resin and 35 parts by weight suspension resin. The glass mat was similar to that used in Example I except that the binder was a latex binder making up about 40 weight percent of the mat. Except as mentioned immediately above, Example II was conducted in the same manner as Example I. As in Example I, the plastisol penetrated about one-half the thickness of the mat until subsequent heating and curing when the plastisol completely penetrated the mat and the foamed plastisol expanded to completely saturate the mat and cover both faces thereof.

While the invention has been described above with respect to preferred embodiments thereof, it will be understood by those skilled in the art that various changes and modifications may be made without departing from the spirit or scope of the invention.

What is claimed is:

1. Decorative, flexible, sheet type covering material having a substrate comprising a porous non-woven mat of glass fibers saturated and completely coated on both sides with foamed, heat cured, polyvinyl chloride plastisol or organosol, said mat being characterized by:
   a. the glass fibers having an average diameter between about 7 and about 15 microns and an average length between about 0.2 and about 1.5 inch;
   b. openings in such mat averaging between about 1 and about 20 mils in the smallest linear dimension with at least about 50 percent of such openings having smallest linear dimensions between about 2 and about 10 mils; and
   c. the mat being between about 10 and about 40 mils thick and having a density between about 1 and about 4 pounds per 100 square feet.

2. Method for making flexible coated substrate material comprising the steps of:
   (a) coating one side only of a porous non-woven mat of glass fibers with foamable polyvinyl chloride plastisol or organosol having a viscosity between about 500 and about 5000 cp at the temperature at which it is coated onto the mat, said mat being characterized by;
      (i) the glass fibers having an average diameter between about 7 and about 15 microns and an average length between about 0.2 and about 1.5 inch;
      (ii) openings in such mat averaging between about 1 and about 20 mils in the smallest linear dimension with at least about 50 percent of such openings having smallest linear dimensions between about 2 and about 10 mils; and
      (iii) the mat being between about 10 and about 40 mils thick and having a density between about 1 and about 4 pounds per 100 square feet;
   (b) causing said foamable plastisol or organosol to completely penetrate said mat by heating the mat to a temperature between about 200° and about 400° F.;
   (c) then foaming said plastisol or organosol so as to saturate and completely coat said mat on both faces thereof with the thus foamed plastisol or organosol; and
   (d) then curing the thus foamed plastisol or organosol.

3. A method according to claim 2 wherein the coating of foamable plastisol or organosol is applied to one side of the mat at a temperature between about 50° and about 120° F. and penetrates between about one-half and about three-fourths the thicknss of the mat at the temperature at which such coating is applied and in which the mat is subsequently heated to a temperature between about 200° and about 400° F. sufficient to cause the plastisol or organosol to completely penetrate the mat prior to foaming thereof and to subsequently cause the plastisol or organosol to foam.

4. A method according to claim 3 wherein the foamable plastisol or organosol is coated onto one side of the mat in a layer between about 10 and about 20 mils thick.

5. A method according to claim 2 wherein the polyvinyl chloride plastisol or organosol contains between about 35 and about 100 weight percent based on polyvinyl chloride resin of dispersion resin with the remainder of such resin being suspension resin.

* * * * *